Sept. 8, 1931.  W. A. McCOLLOUGH  1,822,302

POULTRY FEEDER

Filed April 9, 1927

Inventor
W. A. McCOLLOUGH
By Earl M. Sinclair
Attorney

Patented Sept. 8, 1931

1,822,302

UNITED STATES PATENT OFFICE

WILLIAM A. McCOLLOUGH, OF WEBSTER CITY, IOWA

POULTRY FEEDER

Application filed April 9, 1927. Serial No. 182,298.

The principal object of the present invention is to provide an improved construction for a poultry feeder in which efficient means is included for protecting the feed from rain, snow, and the like.

A further object is to provide an improved construction for a poultry feeder having a novel and efficient arrangement of elements to form a trough, a hopper rising therefrom, ledges having feeding openings, and roofs overhanging and designed to protect the feeding openings against the entrance of rain, snow and other foreign elements.

A further object of this invention is to provide a poultry feeder or the like having a baffle device on its cover which is designed to keep fowls from roosting thereon.

With these and other objects in view, my invention consists in the construction, arrangement and combination of elements hereinafter set forth, pointed out in the claims and indicated by the accompanying drawings in which—

Figure 1:
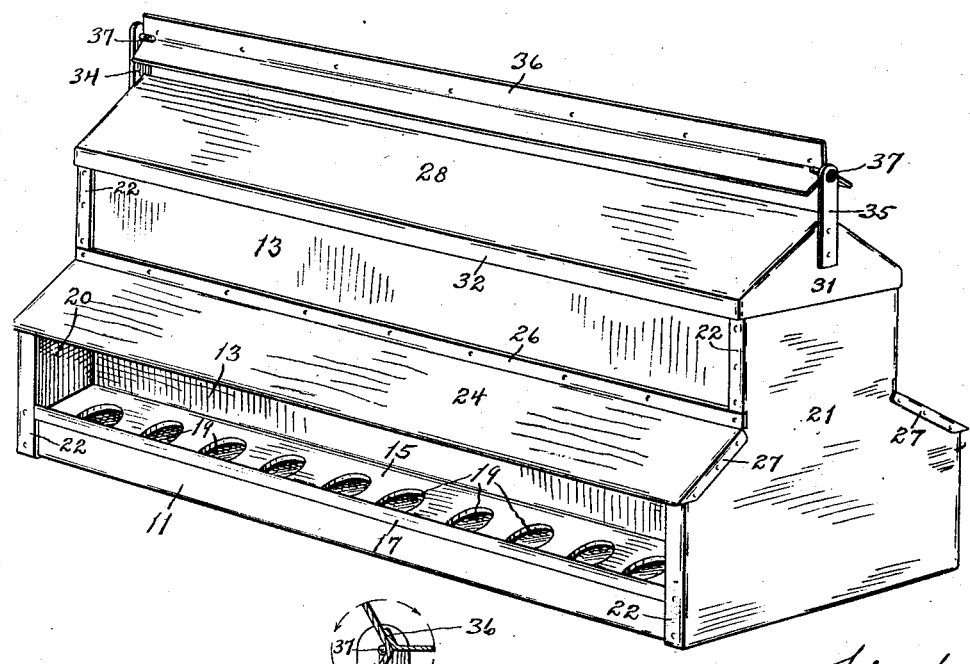
Fig. 1 is a perspective view of the complete device constructed according to my invention.

In the construction of the device, a pan or trough is provided which is formed of a rectangular sheet of metal and so bent and shaped as to produce a bottom 10 which preferably is arched upwardly toward its longitudinal center and also is formed with low side walls 11 and 12 rising from its side margins. A hopper surmounts the trough and is constructed with side walls 13 and 14 which preferably diverge slightly toward their lower ends to prevent packing of the feed in the hopper. The hopper is of less width than the trough and the walls 13 and 14 are turned outwardly at their lower ends to form ledges 15 and 16 respectively. The ledges 15 and 16 preferably slope downwardly somewhat toward their outer margins where they are formed with downwardly opening hook flanges 17 and 18 respectively which flanges engage the upper margins of the respective side walls 11 and 12 and are rigidly secured thereon, thus providing a means for supporting the hopper relative to the trough. The ledges 15 and 16 are each formed with a plurality of feed openings 19 spaced apart throughout their length. End walls 20 and 21 are provided for the structure and each of said walls covers one end of the trough and the hopper. The end walls 20 and 21 are formed on their side margins with flanges 22 which are directed inwardly of the structure and overlap end portions of the hopper walls and trough walls and are rigidly secured thereto by any suitable means such as spot welding. The end walls 20 and 21 in their lower portions correspond in width to the width of the trough and in their upper ends correspond to the width of the hopper but the wider portions of said end walls project upwardly a considerable distance beyond the ledges 15 and 16 and have inclined upper margins 23. Roof members 24 and 25 are provided for covering the spaces above the ledges 15 and 16 and they extend lengthwise on opposite sides of the structure and rest at their ends on the inclined margins 23 of the projecting portions of the respective end walls 20 and 21. The roof members 24 and 25 are formed at their upper margins with upturned flanges 26 which contact with and are secured to the hopper walls 13 and 14 respectively and at their ends said roof members are formed with downturned flanges 27 which overlap upon and are secured to the projecting portions of the end walls 20 and 21. The lower margins of the roof members 24 and 25 project a suitable distance beyond the vertical plane of the trough side walls 11 and 12 and they may be folded back upon themselves or otherwise reinforced at their free margins. By this arrangement a considerable degree of protection is provided against the entrance of rain, snow, and other foreign elements to the ledges 15 and 16 and the feed openings 19 therein and provision also is made for keeping the fowls from getting into the feed. The upper margins of the trough side walls 11 and 12 and the hook flanges 17 and 18 of the ledges thereon extend upwardly above the outer margins of said ledges to prevent the scattering and wasting of feed from the trough.

A suitable cover is provided for the hopper and consists of a sheet of metal bent to form sloping cover members 28 and 29 and provided with gable ends 30 and 31. The cover members 28 and 29 are formed with downwardly extending flanges 32 and 33 at their lower ends which flanges and the gable ends are designed to fit snugly about the upper end of the hopper.

Figure 2:
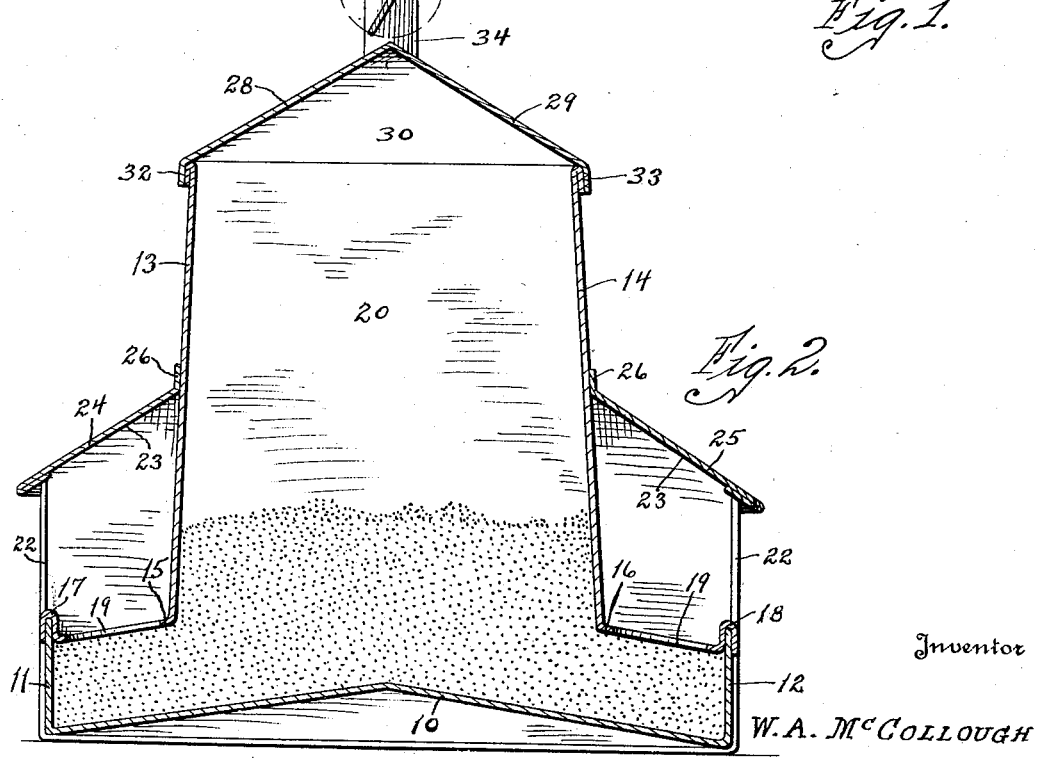
Fig. 2 is a cross section of the same on an enlarged scale.

It is desirable to provide a means to prevent the fowls from roosting on the top of the device and for this purpose I have provided a rotary baffle member. Brackets 34 and 35 are fixed to and extend upwardly from the respective gable ends 30 and 31 of the cover member. The rotary baffle member is designated generally by the numeral 36 and it is formed with a plurality of blades, in this instance three in number, radiating from a common center. The rotary baffle device 36 is mounted between the brackets 34 and 35 and is rotatably carried thereby, by means of studs or rivets 37 secured to the baffle device and pivoted in the upper ends of the brackets and entirely out of contact with the cover members 28 and 29. A fowl attempting to roost on the top of the feeder will cause his weight to be placed upon the margin of one of the blades of the rotary baffle 36 which is in a condition of untable equilibrium and will turn in one direction or another as indicated in Fig. 2, thus causing the fowl to lose its balance and be thrown from the structure. This device effectively prevents the fowls from roosting on the cover of the feeder.

I claim as my invention:

A poultry feeder comprising a trough having bottom and spaced side walls, a hopper having spaced side walls, ledges formed on and extending outwardly from the side walls of said hopper, the marginal portions of said ledges extending upwardly and then over and downwardly in embracing relation to the upper margins of the side walls of the trough, to form downwardly opening hook flanges, whereby the hopper is supported relative to the trough, said ledges being formed with feed openings.

WILLIAM A. McCOLLOUGH.